United States Patent
Bierhoff et al.

(10) Patent No.: US 7,046,908 B2
(45) Date of Patent: May 16, 2006

(54) RAY TRACING IN HIGHLY MULTIMODAL CHANNEL WAVEGUIDES

(75) Inventors: Thomas Bierhoff, Volkmarsen (DE); Andreas Himmler, Paderborn (DE)

(73) Assignee: Siemens Aktiengellschaft, Munich (DE)

( * ) Notice: Subject to any disclaimer, the term of this patent is extended or adjusted under 35 U.S.C. 154(b) by 34 days.

(21) Appl. No.: 10/399,258

(22) PCT Filed: Oct. 17, 2001

(86) PCT No.: PCT/DE01/03962

§ 371 (c)(1),
(2), (4) Date: Sep. 23, 2003

(87) PCT Pub. No.: WO02/33455

PCT Pub. Date: Apr. 25, 2002

(65) Prior Publication Data

US 2004/0052488 A1    Mar. 18, 2004

(30) Foreign Application Priority Data

Oct. 17, 2000   (DE)   ................. 100 51 405

(51) Int. Cl.
   *G02B 6/00*   (2006.01)
(52) U.S. Cl. .............. 385/147; 385/132; 345/418; 702/40; 703/6
(58) Field of Classification Search .......... 385/37, 385/147, 129–132
   See application file for complete search history.

(56) References Cited

OTHER PUBLICATIONS

European Microwave Conference (30th:2000:Difense,Paris,France), 30th European Microwave Conference: conference proceddings, Oct. 3, 2000, London: Microwave Engineering Europe, pgs cover, 378-381.*

* cited by examiner

*Primary Examiner*—Frank G. Font
*Assistant Examiner*—Ryan Lepisto
(74) *Attorney, Agent, or Firm*—Morrison & Foerster LLP

(57) ABSTRACT

The invention relates to a method for computationally determining optical properties of a channel waveguide, according to which, for an incident ray entering an entrance surface, the distribution of intensity over an emergence surface is determined by adjoined partial rays that possibly split up. From an incident partial ray striking the outer surface, a predetermined algorithm determines a reflected main ray and, in so far as it is necessary according to the ensuing course of events, determines a number of scattered rays of a higher order, which depict partial rays and are recursively traced further. Each partial ray is either a primary ray or a secondary ray. When the incident partial ray is a primary ray, the reflected main ray is a primary ray once again, and the scattered rays are secondary rays. During the reflection of secondary ray, only the reflected main ray is considered as the secondary ray.

2 Claims, 1 Drawing Sheet

RAY TRACING IN HIGHLY MULTIMODAL CHANNEL WAVEGUIDES

CLAIM FOR PRIORITY

This application claims priority to International Application No. PCT/DE01/03962 which was published in the German Language on Apr. 25, 2002.

TECHNICAL FIELD OF THE INVENTION

The invention relates to ray tracing in highly multimodal channel waveguides.

BACKGROUND OF THE INVENTION

Wave optics analysis methods, such as the finite elements method (FEM) or the beam propagation method (BPM), are available for calculating ray propagation in dielectric channel waveguides. These methods, however, can only be used effectively if only one or a few modes have to be considered and the cross-section of the waveguides is not too great in relation to the optical wavelength.

In the case of multimodal step index waveguides, the cross-section of which is significantly greater than the wavelength of the radiation used, ray tracing can be carried out effectively on the basis of geometric optics.

In this process (during simulation) a single ray of predetermined direction and polarization is input into the waveguide. This either emerges directly at the end of the waveguide or is fractured on the wall of the optical channel, i.e. the interface of the indexed jump.

The incident radiation is then split into components: one reflected main ray, one transmitted main ray, a number of reflected scattered rays and a number of transmitted scattered rays. The transmitted ray parts are insignificant for further ray tracing; only their energy component is lost to the reflected rays.

A simple simulation only considers the reflected main ray, i.e. the zero order reflection, and traces its further reflection to the emergence surface. This means that by tracing a larger number of rays individually, which correspond to the characteristics of the transmitter, the beam can be determined at the waveguide exit. This method is adequate if the reflections are almost ideal, because the wall is very smooth.

If the wall is not smooth however, the method gives results which correspond only poorly to the corresponding measurements. Consideration of the reflected scattered rays however involves additional computation, which increases exponentially with the number of reflections.

SUMMARY OF THE INVENTION

The invention specifies a method, in which scattered rays are taken into account but their additional computation increases quadratically with the number of reflections. In this regard, the invention makes a distinction between primary and secondary rays and only considers zero order reflections for secondary rays.

In one embodiment of the invention, there is a method for computationally determining optical properties of a channel waveguide, according to which, for an incident ray entering an entrance surface, the distribution of intensity over an emergence surface is determined by adjoining partial rays that possibly split up. From an incident partial ray striking the outer surface, a predetermined algorithm determines a reflected main ray and, in so far as it is necessary according to the ensuing course of events, determines a number of scattered rays of a higher order, which for their part depict partial rays and are recursively traced further. Each partial ray is either a primary ray or a secondary ray. When the incident partial ray is a primary ray, the reflected main ray is a primary ray once again, and the scattered rays are secondary rays. During the reflection of a secondary ray, the reflected main ray is considered as the secondary ray.

BRIEF DESCRIPTION OF THE DRAWINGS

Embodiments of the invention are detailed below with reference to the drawings, in which.

DETAILED DESCRIPTION OF THE INVENTION

Figure 1:
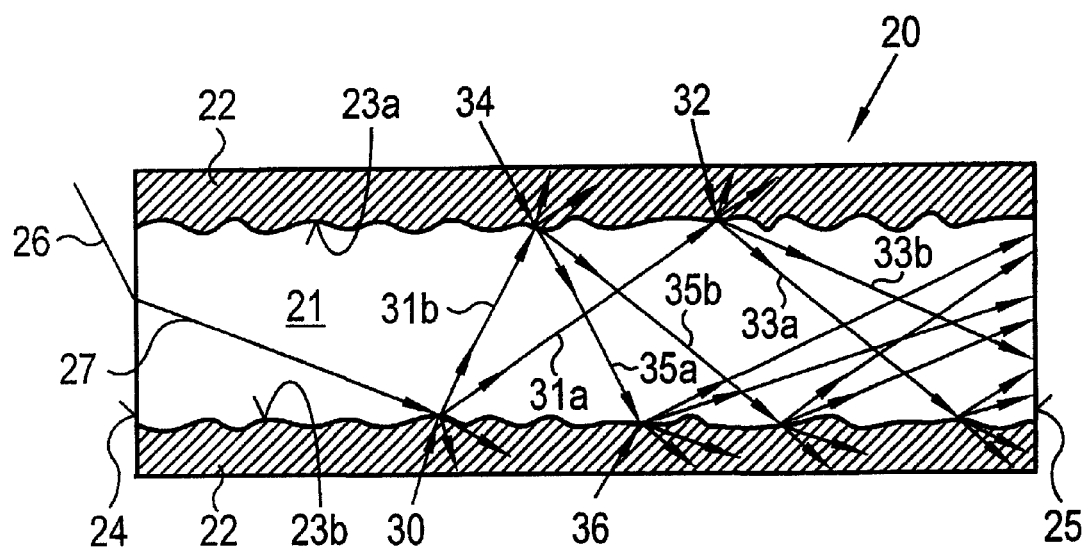
FIG. 1 shows a two-dimensional depiction of a model for ray tracing in a channel waveguide with a rough surface.

FIG. 1 shows a two dimensional depiction to describe the method as disclosed in "An Efficient Monte Carlo Based Ray Tracing Technique for the Characterization of Highly Multimode Dielectric Waveguides with Rough Surfaces" by Th. Bierhoff et al., Proc. 30$^{th}$ European Microwave Conference, vol. 1, pages 378–381, Paris, Oct. 3–5, 2000.

FIG. 1 shows a diagram of a longitudinal section through a channel waveguide 20, which has a core 21 and a casing 22, also referred to as cladding. The cross-section (not shown) may be round or rectangular. Other cross-sections can also be used but are less practical to manufacture. The waveguide is a step index waveguide, because there is a relatively sharp transition between the core 21 and the casing 22 resulting in a step in the refractive index, with the refractive index of the core 21 being known to be greater than that of the casing 22. Interfaces 23a and 23b result, at which a ray in the core 21, which strikes the interface, is reflected. The interfaces here are shown as corrugated, to indicate that surface roughness is important. In this case, however, they are initially assumed to be planes or other surfaces which can be described simply and in particular analytically.

The channel waveguide has an entrance surface 24 and an emergence surface 25. A light (ray) 26 strikes the entrance surface 24, is fractured at the entrance surface 24 and is continued as an input ray 27. The occurrence and extent of the fracture depend on the nature and medium of the coupling. Only the input ray 27 is significant for the further procedure. This reaches the interface 23b at a first reflection point 30 and is fractured and reflected there.

Calculation of such a ray path with the tools of geometric optics is widely known. If the channel waveguide has a rectangular cross-section, the interfaces 23a, 23b are in turn rectangular, so that with a given straight line for the input ray 27, the point of intersection of the straight line with one of the interfaces, in this case the interface 23b, can be determined with the known methods of analytical geometry. If the cross-section is round, the interface 23a, 23b is a cylinder, with which the point of intersection can also be calculated. Iterative, numerical methods should be used where necessary with unusual or variable cross-sections.

The continuation of the input ray 30 incident at the first point of reflection 30 is based on the simulation parameters. The intensity and direction of the directly reflected ray 31a are then determined. The direction is based on the tangents of the idealized interface 23b, which is assumed to be rough.

Figure 2:
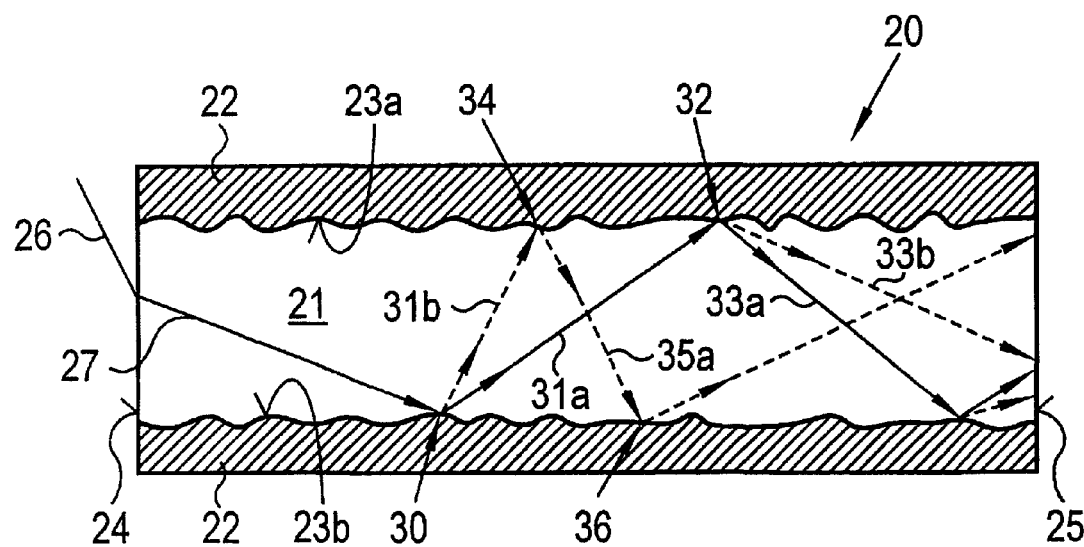
FIG. 2 shows a two-dimensional depiction reduced to the partial rays used in the invention.

Diffuse scattered rays are also determined and these are represented in FIG. 2 by a single scattered ray 31b. A solid angle, in which scattered radiation is continuously present, is merged to a single ray in the model. The scattered ray 31b here represents the scattered radiation in a given solid angle, which is transported by a plane wave of defined polarization; in the case of adjoining solid angles, further scattered rays are determined accordingly and these are treated in the same way but are not shown for the sake of clarity. A fractured primary ray and a fractured scattered ray are also indicated by means of arrows. Their further path is of little to no significance. Rather, it is essential that the sum of all intensities are equal to that of the incident input ray 27.

The directly reflected main ray 31a strikes an interface again at the point 32, in this case the interface 23a, and is directed there into a reflected main ray 33a and a number of reflected secondary rays 33b, of which again only one is depicted. The transmitted rays are considered depending on their proportion.

The reflected scattered ray correspondingly strikes the interface 23b at the point 36 and produces a main ray and a number of scattered rays.

It is clear that this response on the part of the structure is relatively simple to program using recursive methods. It is however also immediately clear that the number of rays increases exponentially, in particular with a plurality of scattered rays. In this process rays, the intensity of which is below a predetermined threshold, are of course not considered further. It should be noted that either the threshold is so high that the results are not good enough or too much computation time is required.

It is therefore proposed that the complexity be reduced by using the Monte Carlo method. This generally known method selects one of the scattered rays by a random mechanism and ignores the others. This resulted in a reduction in computation time but overall as yet no simple, fast and unproblematic solution.

The invention means that the Monte Carlo method can be dispensed with and a significantly better result can be achieved in relation to computation time. The scattered rays occurring according to the reflection model are traced further, not just a few which have been randomly selected. For these scattered rays, the main ray is considered in the subsequent reflections. In each instance the model of the reflection is calculated to determine the intensity of the main ray; a simple mirror model is therefore not necessarily used for these secondary rays but this is also possible.

This is also achieved by incorporating a generation index into every ray to be traced, which indicates whether it is a primary ray or a secondary ray. A whole number is preferably used for this, which is zero for a primary ray and greater than zero for a secondary ray.

This is shown in the diagram in FIG. 2. The transmitted parts have in any case not been shown. Also the secondary scattered rays produced by the secondary scattered ray 31b are no longer traced further. However the secondary partial ray 33b continues to be taken into account as emerging from a primary partial ray 31a during the reflection 32.

With the simple embodiment described above, a binary generation index is used or a distinction is made between primary and secondary rays. It is also possible to improve the simulation by utilizing the generation index as a whole number. The generation index then remains the same with the main ray of a reflection, i.e. a zero order reflection. In the case of scattered rays, i.e. higher order reflections, the order number is added to the generation index. A decision is then made above a threshold value for the generation index as to whether a ray is traced further. In the example above, first order reflections are considered and the threshold value is one.

The improved efficiency means that polarization could also be taken into account during the reflection and this had to be ignored with the above-mentioned Monte Carlo method.

What is claimed is:

1. A method for the computational determination of optical properties of a channel waveguide with an outer surface, with a resulting ray distortion being determined for an incident ray striking an entrance surface over an emergence surface, comprising:

determining at least one of a reflected main ray of order zero and a number of scattered rays with an order greater than zero, which in turn depict partial rays and are recursively traced, with respect to an incident partial ray striking the outer surface, the incident ray being the first partial ray;

assigning a generation index to each partial ray, where the incident ray has the generation index zero, and during reflection, the generation index of a reflected partial ray is equal to the generation index of the incident partial ray increased by an order of the reflection; and tracing the partial rays, the generation index of which does not exceed a predetermined threshold.

2. The method according to claim 1, wherein the predetermined threshold is equal to one and scattered rays of order one used in calculation of the reflection.

\* \* \* \* \*